United States Patent
Okuhara

(10) Patent No.: US 10,289,941 B2
(45) Date of Patent: May 14, 2019

(54) PRINTING APPARATUS THAT PRINTS IMAGES RECEIVED FROM A PLURALITY OF EXTERNAL APPARATUSES, METHOD OF CONTROLLING THE SAME, AND STORAGE MEDIUM

(71) Applicant: CANON KABUSHIKI KAISHA, Tokyo (JP)

(72) Inventor: Ryusuke Okuhara, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/825,265

(22) Filed: Nov. 29, 2017

(65) Prior Publication Data
US 2018/0165555 A1    Jun. 14, 2018

(30) Foreign Application Priority Data
Dec. 14, 2016   (JP) .................................. 2016-242103

(51) Int. Cl.
| | |
|---|---|
| G06K 15/02 | (2006.01) |
| B41J 21/00 | (2006.01) |
| H04N 5/76 | (2006.01) |
| H04N 5/765 | (2006.01) |

(52) U.S. Cl.
CPC .......... *G06K 15/1819* (2013.01); *B41J 21/00* (2013.01); *G06K 15/02* (2013.01); *G06K 15/1805* (2013.01); *G06K 15/1843* (2013.01); *G06K 15/1886* (2013.01); *H04N 5/76* (2013.01); *H04N 5/765* (2013.01)

(58) Field of Classification Search
CPC .......... G06K 15/1805; G06K 15/1843; G06K 15/1886; G06K 15/1819; G06K 15/02; H04N 5/76; H04N 5/765; B41J 21/00
USPC ......................................................... 358/1.15
See application file for complete search history.

(56) References Cited

U.S. PATENT DOCUMENTS

| | | | |
|---|---|---|---|
| 6,806,978 B1 * | 10/2004 | Tamura .............. | H04N 1/00278 348/207.2 |
| 7,268,904 B2 * | 9/2007 | Matsumoto ........ | H04N 1/00143 358/1.15 |
| 7,286,256 B2 * | 10/2007 | Herbert .............. | H04N 1/00132 358/1.15 |
| 2002/0054168 A1 * | 5/2002 | Ohmura ............. | H04N 1/00278 715/854 |
| 2003/0128390 A1 * | 7/2003 | Yip .................... | H04N 1/00204 358/1.18 |
| 2005/0052676 A1 * | 3/2005 | Masumoto ............. | G06F 3/122 358/1.13 |

(Continued)

FOREIGN PATENT DOCUMENTS

JP         2004242351 A      8/2004

*Primary Examiner* — Allen H Nguyen
(74) *Attorney, Agent, or Firm* — Rossi, Kimms & McDowell LLP

(57) ABSTRACT

A technique for controlling a printing apparatus, which makes it possible to print image data items received from a plurality of external apparatuses on one recording sheet. The printing apparatus is capable of performing wireless communication with a plurality of external apparatuses, and prints images received from the plurality of external apparatuses on a sheet. When the number of images received from the plurality of external apparatuses reaches a specified number, the specified number of received images are printed on one sheet.

18 Claims, 12 Drawing Sheets

(56) References Cited

U.S. PATENT DOCUMENTS

| | | | |
|---|---|---|---|
| 2009/0147298 A1* | 6/2009 | Takahashi | H04N 1/3935 358/1.15 |
| 2013/0003122 A1* | 1/2013 | Tsuji | G06F 3/1204 358/1.15 |
| 2014/0063311 A1* | 3/2014 | McCauley | H04N 1/00137 348/333.01 |
| 2015/0036177 A1* | 2/2015 | Naruse | H04N 1/00307 358/1.15 |
| 2016/0139761 A1* | 5/2016 | Grosz | G06F 3/1243 715/769 |

* cited by examiner

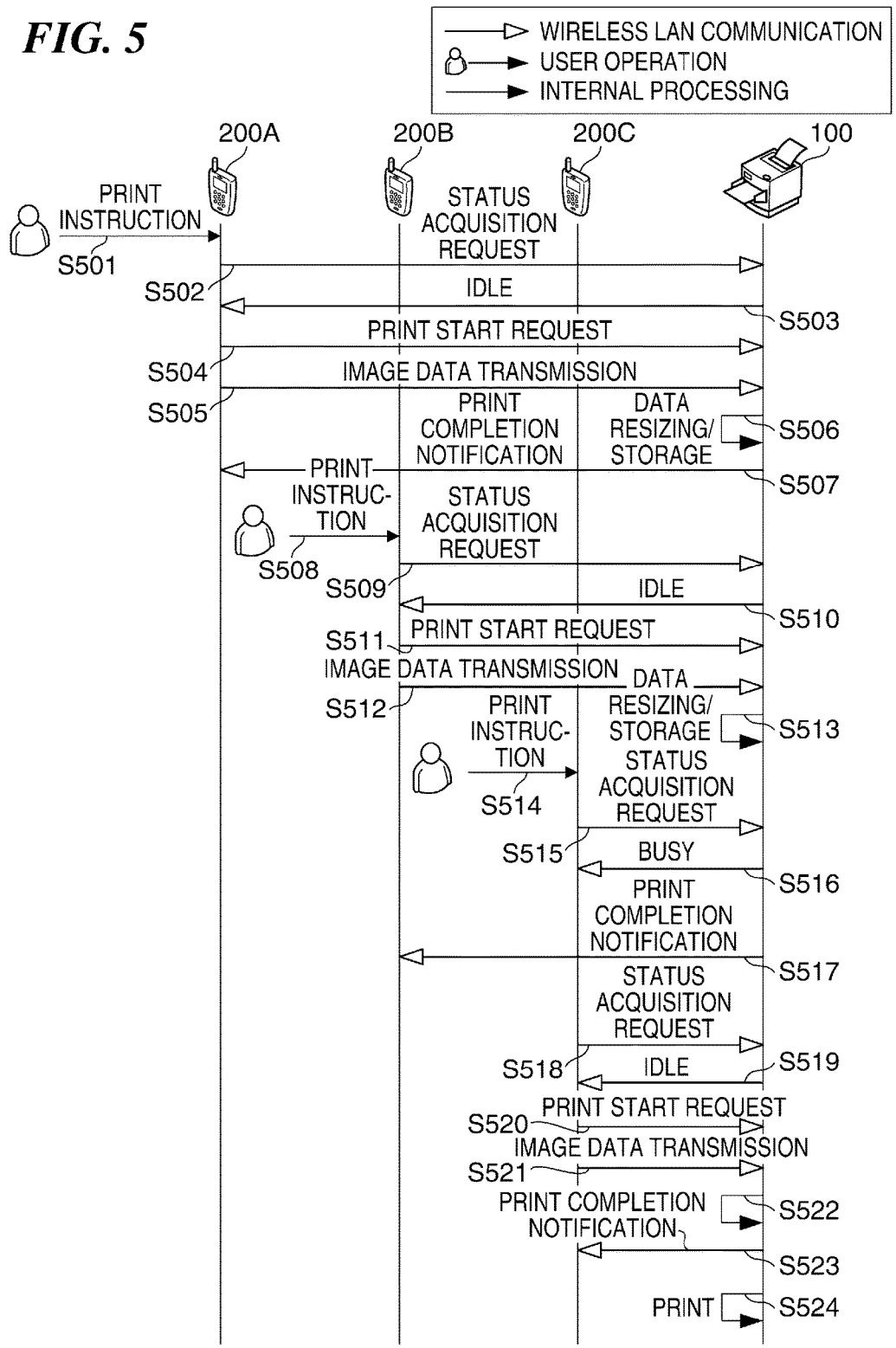

PRINTING APPARATUS THAT PRINTS IMAGES RECEIVED FROM A PLURALITY OF EXTERNAL APPARATUSES, METHOD OF CONTROLLING THE SAME, AND STORAGE MEDIUM

BACKGROUND OF THE INVENTION

Field of the Invention

The present invention relates to a printing apparatus that prints image data received from a plurality of external apparatuses on one recording sheet, a method of controlling the same, and a storage medium.

Description of the Related Art

Conventionally, a printing apparatus is capable of receiving image data from an external image processing apparatus via wired communication or wireless communication, and printing the received image data on a recording sheet. Further, by mounting a recording medium, such as a memory card, on a printing apparatus, it is possible to print image data recorded in the recording medium. Furthermore, depending on an image processing apparatus that transmits image data and a printing apparatus that prints the image data, it is possible to print a plurality of image data items on one recording sheet by setting a print layout and so forth.

For example, Japanese Laid-Open Patent Publication (Kokai) No. 2004-242351 discloses a technique in which one of two printing apparatuses each equipped with an image pickup apparatus photographs image data and transmits the image data to the other printing apparatus, and the other printing apparatus prints image data photographed by itself and the received image data, on one recording sheet.

However, in Japanese Laid-Open Patent Publication (Kokai) No. 2004-242351, image data transmission and reception is performed between the printing apparatuses each having the same functions, and one of the printing apparatuses prints the received image data and the image data photographed by itself, on one recording sheet. That is, the technique disclosed in Japanese Laid-Open Patent Publication (Kokai) No. 2004-242351 is applied limitedly to the printing apparatus equipped with the image pickup apparatus, and a case is not taken into account in which a printing apparatus which is not equipped with an image pickup apparatus performs communication with a plurality of external apparatuses to receive image data, and the printing apparatus prints the received image data.

SUMMARY OF THE INVENTION

The present invention provides a technique for controlling a printing apparatus, which enables the printing apparatus to print image data items received from a plurality of external apparatuses on one recording sheet.

In a first aspect of the present invention, there is provided a printing apparatus comprising a communication unit configured to be capable of performing wireless communication with a plurality of external apparatuses, a print unit configured to print images received from the plurality of external apparatuses by the communication unit, on a sheet, and a control unit configured to perform control such that when the number of images received from the plurality of external apparatuses by the communication unit reaches a specified number, the specified number of images received from the plurality of external apparatuses are printed on one sheet.

In a second aspect of the present invention, there is provided a method of controlling a printing apparatus including a communication unit that is capable of performing wireless communication with a plurality of external apparatuses, and a print unit that prints images received from the plurality of external apparatuses by the communication unit, on a sheet, comprising determining whether or not the number of images received from the plurality of external apparatuses by the communication unit reaches a specified number, and performing control such that in a case where it is determined that the number of received images reaches the specified number, the specified number of images received from the plurality of external apparatuses are printed on one sheet.

In a third aspect of the present invention, there is provided a non-transitory computer-readable storage medium storing a computer-executable program for executing a method of controlling a printing apparatus including a communication unit that is capable of performing wireless communication with a plurality of external apparatuses, and a print unit that prints images received from the plurality of external apparatuses by the communication unit, on a sheet, wherein the control method comprises determining whether or not the number of images received from the plurality of external apparatuses by the communication unit reaches a specified number, and performing control such that in a case where it is determined that the number of received images reaches the specified number, the specified number of images received from the plurality of external apparatuses are printed on one sheet.

According to the present invention, the printing apparatus is capable of printing image data items received from a plurality of external apparatuses on one recording sheet.

Further features of the present invention will become apparent from the following description of exemplary embodiments (with reference to the attached drawings).

BRIEF DESCRIPTION OF THE DRAWINGS

FIG. 5 is a sequence diagram useful in explaining operations performed between the printing apparatus and the plurality of mobile phones when the printing apparatus is set to the party mode.

DESCRIPTION OF THE EMBODIMENTS

The present invention will now be described in detail below with reference to the accompanying drawings showing embodiments thereof. Note that the embodiments described below are examples of means for realizing the present invention, and may be modified or changed depending on the configuration of an apparatus to which the present invention is applied and various conditions. Further, it is possible to combine some or all of the embodiments as appropriate.

First, a description will be given of the configuration and functions of a printing apparatus 100 according to a first embodiment of the present invention, with reference to FIG. 1.

Figure 1:
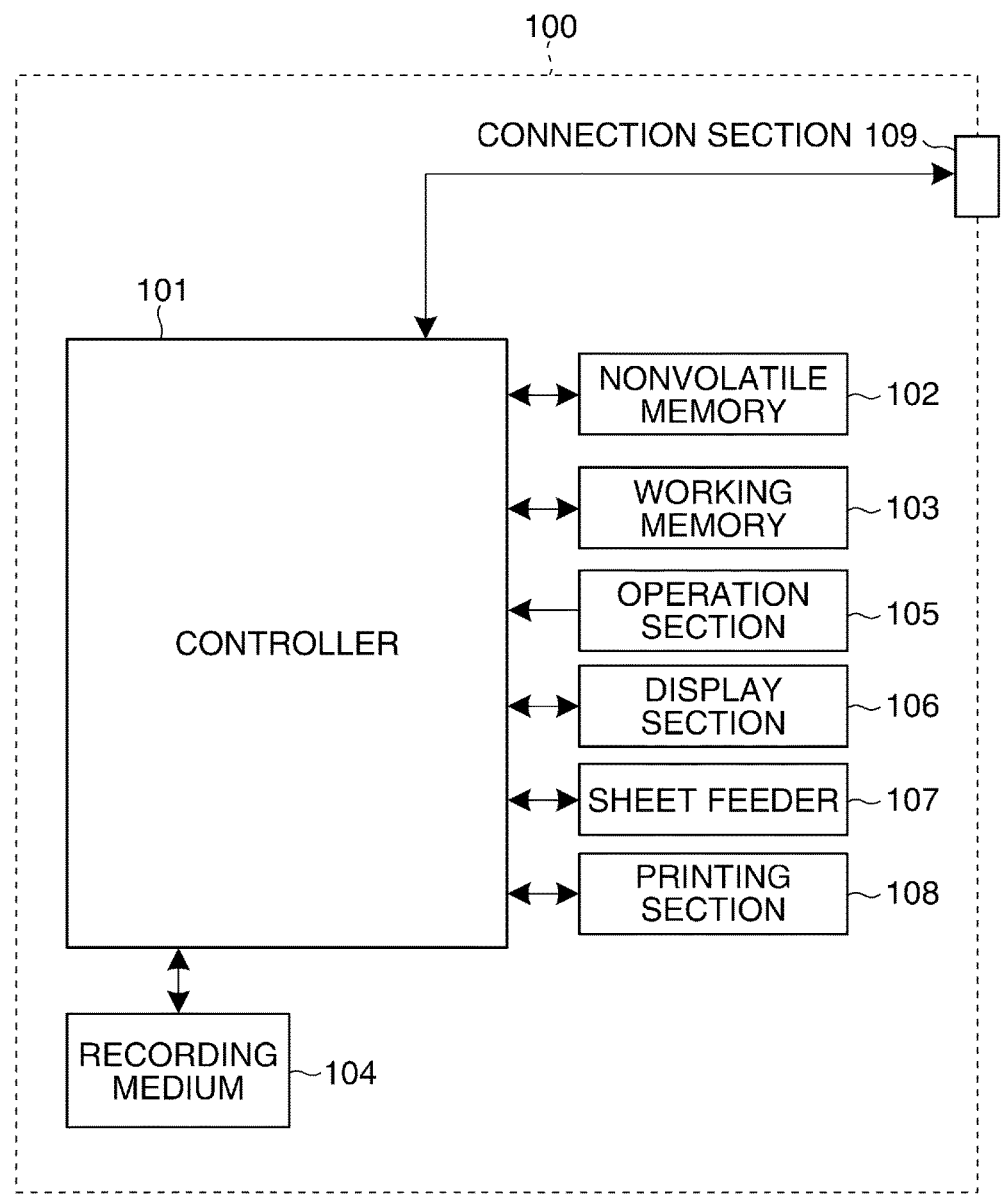
FIG. 1 is a block diagram of a printing apparatus according to a first embodiment of the present invention.

Referring to FIG. 1, a controller 101 controls components of the printing apparatus 100 according to signals input thereto and programs, referred to hereinafter. Note that instead of the controller 101 controlling the overall operation of the apparatus, a plurality of hardware items may share processes to be performed by the controller 101 to thereby control the overall operation of the apparatus.

A nonvolatile memory 102 is an electrically erasable and recordable nonvolatile memory that stores the programs, referred to hereinafter, which are executed by the controller 101, and so forth.

A working memory 103 is used as a work memory for the controller 101 that executes processing, an image display memory for a display section 106, a buffer memory for temporarily storing image data received from a connection section 109, and so forth.

A recording medium 104 is capable of holding image data, etc. The recording medium 104 may be configured to be removable from the printing apparatus 100, or may be incorporated in the printing apparatus 100. That is, the printing apparatus 100 is only required to have at least means for accessing the recording medium 104.

An operation section 105 is used to receive instructions given by a user to the printing apparatus 100. The operation section 105 includes operation members, such as a power supply button used by the user to instruct power-on/off of the printing apparatus 100, a print start button for instructing printing, and a right/left button for instructing image scrolling when reproducing image data. Further, a touch panel formed on the display section 106, referred to below, is also included in the operation section 105.

The display section 106 displays image data, characters for an interactive operation screen, and so forth. The display section 106 is not necessarily required to be included in the printing apparatus 100. The printing apparatus 100 is only required to be capable of connecting to the display section 106 which may be internal or external, and include at least a display control function for controlling the display on the display section 106.

A sheet feeder 107 accommodates recording sheets, and conveys a recording sheet to a printing section 108, referred to hereinafter. The sheet feeder 107 may be configured to be provided with a sensor or switch for acquiring the size of accommodated recording sheets, to thereby acquire the size of the accommodated recording sheets. Alternatively, the sheet feeder 107 may be configured to accommodate a plurality of types of recording sheets having different sizes. Note that the recording sheet is not limited to paper, but includes a sheet material other than paper.

The printing section 108 performs printing on a recording sheet conveyed from the sheet feeder 107.

The connection section 109 is an interface for connection to an external apparatus. The printing apparatus 100 according to the present embodiment is capable of exchanging data with an external apparatus via the connection section 109. In the present embodiment, the connection section 109 includes an interface for communicating with an external apparatus via a wireless LAN. The controller 101 realizes wireless communication with an external apparatus by controlling the connection section 109. Note that the communication method is not limited to the wireless LAN.

The printing apparatus 100 according to the present embodiment can operate as a slave apparatus in the infrastructure mode of the wireless LAN. When the printing apparatus 100 operates as a slave apparatus, by connecting to a peripheral access point (hereinafter referred to as the AP), the printing apparatus 100 can participate in a network formed by the AP.

Further, the printing apparatus 100 according to the present embodiment can also operate as a simplified AP, which is a kind of AP but more limited in function (hereinafter referred to as the simple AP). The AP in the present embodiment is an example of a relay device. When the printing apparatus 100 operates as the simple AP, the printing apparatus 100 itself forms a network. Apparatuses around the printing apparatus 100 recognize the printing apparatus 100 as the AP, and are enabled to participate in the network formed by the printing apparatus 100. Note that a program for operating the printing apparatus 100 as above is stored in the nonvolatile memory 102.

Although the printing apparatus 100 according to the present embodiment is a kind of the AP, but it is the simple AP which does not have a gateway function for transferring data received from a slave apparatus, to an Internet provider or the like. Therefore, even when the printing apparatus 100 receives data from an external apparatus participating in the network formed by the printing apparatus 100, the printing apparatus 100 cannot transfer the received data to an external network, such as the Internet. Note that another embodiment can be configured to provide the printing apparatus 100 with the gateway function.

Next, a description will be given of the configuration and functions of a mobile phone 200 as an example of the external apparatus of the present invention, with reference to FIG. 2. In the present embodiment, the mobile phone will be described as the external apparatus of the present invention by way of example, this is not limitative. The present invention can be applied to external apparatuses, such as a digital camera having a wireless communication function, a portable media player, a so-called tablet device, a personal computer, and a smartphone.

Figure 2:
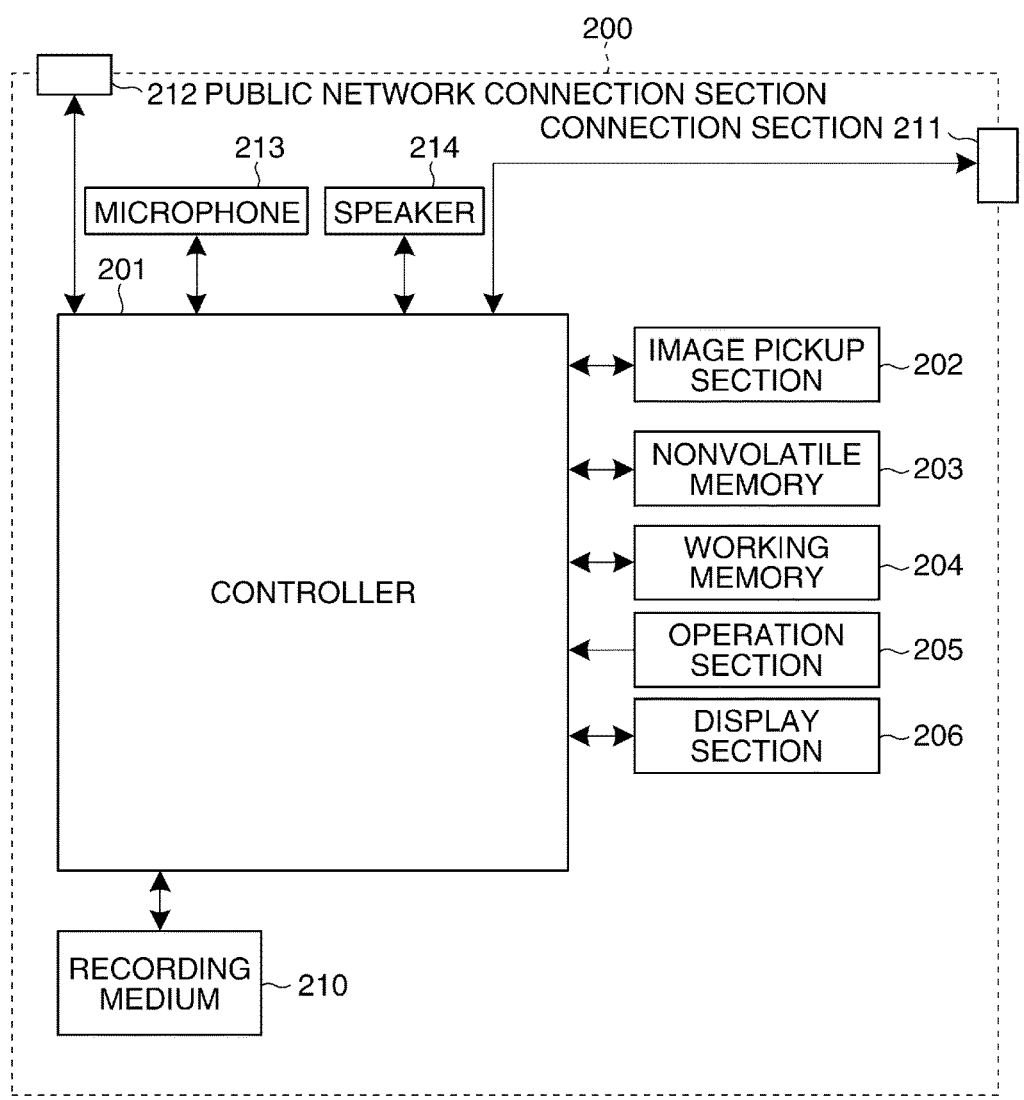
FIG. 2 is a block diagram of a mobile phone.

Referring to FIG. 2, a controller 201 controls components of the mobile phone 200 according to signals input thereto and programs, referred to hereinafter. Note that instead of the controller 201 controlling the overall operation of the apparatus, a plurality of hardware items may share processes to be performed by the controller 201 to thereby control the overall operation of the apparatus.

An image pickup section 202 converts an object light formed into an image through a lens included in the image pickup section 202 to electric signals, performs noise reduction processing etc. on the electric signals, and outputs obtained digital data as image data. The photographed image data is stored in a buffer memory, then, subjected to predetermined operation processing by the controller 201, and recorded in a recording medium 210.

A nonvolatile memory 203 is an electrically erasable and recordable nonvolatile memory that stores various programs executed by the controller 201, etc. It is assumed that a program for communicating with the printing apparatus 100 is also stored in the nonvolatile memory 203 and has been installed as a print application. Processes performed by the mobile phone 200 are realized by reading print application programs from the nonvolatile memory 203. Further, it is assumed that the print application programs include a program for using a basic function of an OS (Operating System) installed in the mobile phone 200. Note that the OS of the mobile phone 200 may include the programs for realizing the processes in the present embodiment.

A working memory 204 is used as a buffer memory for temporarily storing image data generated by the image pickup section 202, an image display memory for a display section 206, a work area for the controller 201, and so forth.

An operation section 205 is used to receive instructions given by the user to the mobile phone 200. The operation section 205 includes operation members, such as a power supply button used by the user to instruct power-on/off of the mobile phone 200, and a touch panel formed on the display section 206.

The display section 206 displays image data, characters for an interactive operation, and so forth. The display section 206 is not necessarily required to be included in the mobile phone 200. That is, the mobile phone 200 is only required to be capable of connecting to the external display section 206, and include at least a display control function for controlling the display on the display section 206.

The recording medium 210 is capable of recording image data output from the image pickup section 202. The recording medium 210 may be configured to be removable from the mobile phone 200, or may be incorporated in the mobile phone 200. That is, the mobile phone 200 is only required to have at least means for accessing the recording medium 210.

A connection section 211 is an interface for connecting to the printing apparatus 100. The mobile phone 200 in the present embodiment is capable of exchanging data with the printing apparatus 100 via the connection section 211. In the present embodiment, the connection section 211 includes an interface for communicating with the printing apparatus 100 via a wireless LAN. The controller 201 realizes wireless communication with the printing apparatus 100 by controlling the connection section 211. Note that the mobile phone 200 in the present embodiment can operate at least as a slave apparatus in the infrastructure mode, and can participate in a network formed by an AP therearound.

A public network connection section 212 is an interface used when performing public wireless communication. The mobile phone 200 is capable of performing voice communication and data communication with other devices via the public network connection section 212. When performing voice communication, the controller 201 inputs and outputs voice signals via a microphone 213 and a speaker 214. In the present embodiment, the public network connection section 212 includes an interface for performing 3G communication. Note that the communication system is not limited to 3G, but any other communication system, such as LTE, WiMAX, ADSL, FTTH, and so-called 4G, may be used. Further, the connection section 211 and the public network connection section 212 are not necessarily required to be implemented by independent hardware items, and one antenna can be commonly used as the connection section 211 and the public network connection section 212.

Next, a description will be given of the network configuration in which the printing apparatus 100 according to the present embodiment and a plurality of mobile phones 200A, 200B, 200C, . . . are connected, with reference to FIGS. 3A and 3B.

Figure 3A:
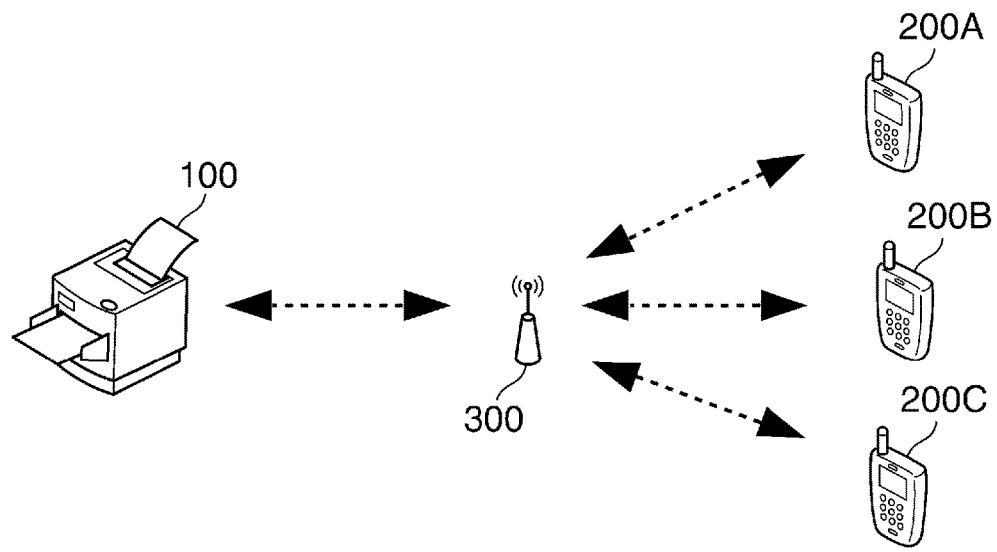
FIG. 3A is a diagram of a network configuration in which the printing apparatus and a plurality of mobile phones are connected via an external access point.
Figure 3B:
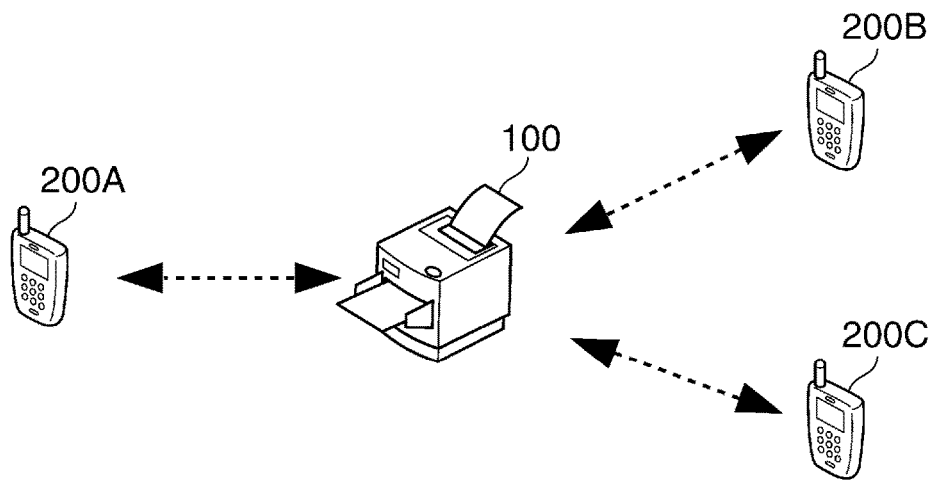
FIG. 3B is a diagram of a network configuration in which the printing apparatus and the plurality of mobile phones are directly connected without using an external access point.

In a case where the printing apparatus 100 and the mobile phones 200A, 200B, 200C, . . . performs data transmission and reception therebetween by wireless LAN, two data communication modes, shown in FIGS. 3A and 3B, respectively, can be envisaged.

FIG. 3A shows a first data communication mode in which the printing apparatus 100 and the mobile phones 200A, 200B, 200C, . . . participate in a wireless LAN network formed by an external AP 300 as an example of an external relay device. The printing apparatus 100 and the mobile phones 200A, 200B, 200C, . . . detect a beacon signal periodically transmitted by the external AP 300, and participate in the wireless LAN network formed by the external AP 300. After the printing apparatus 100 and the mobile phones 200A, 200B, 200C, . . . participate in the same wireless LAN network, each of them establishes connection with a mating apparatus through discrimination of each other and acquisition of the capability of the mating apparatus, thereby being enabled to transmit and receive data to and from the mating apparatus by wireless LAN.

FIG. 3B shows a second data communication mode in which the printing apparatus 100 and the mobile phones 200A, 200B, 200C, . . . are directly connected without via the external AP 300. In this case, the printing apparatus 100 operates as a simple AP, and forms a wireless LAN network. When the printing apparatus 100 operates as the simple AP, the printing apparatus 100 starts to periodically transmit a beacon signal. The mobile phones 200A, 200B, 200C, . . . detect the beacon signal, and participate in the wireless LAN network formed by the printing apparatus 100. Then, similar to the case shown in FIG. 3A, each of the printing apparatus 100 and the mobile phones 200A, 200B, 200C, . . . establishes connection with a mating apparatus through discrimination of each other and acquisition of the capability of the mating apparatus, thereby being enabled to transmit and receive data to and from the mating apparatus by wireless LAN.

Note that, as mentioned above, the printing apparatus 100 according to the present embodiment is not equipped with the communication function for communicating with an external network, such as the Internet. Therefore, the mobile phones 200A, 200B, 200C, . . . participating in the wireless LAN network formed by the printing apparatus 100 cannot transmit data to the Internet or the like via the simple AP.

As described above, the printing apparatus 100 and the mobile phones 200A, 200B, 200C, . . . can use two data communication modes. When the printing apparatus 100 operates as the simple AP, it can determine a network identifier, encryption information, an encryption key, and a used channel of the wireless LAN network formed by the self-apparatus. In this case, a different network identifier can be used depending on whether or not the printing apparatus 100 is set to a party mode described hereinafter.

The mobile phones 200A, 200B, 200C, . . . which are mating communication apparatuses of the printing apparatus 100, can participate in the wireless LAN network formed by the printing apparatus 100 using the network identifier. Although in the present embodiment, it is assumed that as the network identifier, an ESSID is used, this is not limitative.

In the present embodiment, the printing apparatus 100 uses a different ESSID depending on whether or not the printing apparatus 100 is set to the party mode, and hence the printing apparatus 100 stores an identifier ESSID to be used when the printing apparatus 100 is not set to the party mode. Then, when the printing apparatus 100 is set to the party mode, the printing apparatus 100 changes the stored ESSID to another ESSID associated with the party mode, but the printing apparatus 100 may use any other method insofar as a different ESSID is used depending on whether or not the printing apparatus 100 is set to the party mode.

Further, even in the case where the printing apparatus 100 operates as the simple AP, when connecting the wireless LAN network formed by the external AP 300, each apparatus establishes connection with a mating apparatus through discrimination of each other and acquisition of the capability of the mating apparatus. At this time, the printing apparatus 100 can notify each of the mobile phones 200A, 200B, 200C, . . . of the printer name. In this case, a different printer name can be used depending on whether or not the printing apparatus 100 is set to the party mode described hereinafter.

Note that the mobile phones 200A, 200B, 200C, . . . or a user of each of the mobile phones may be enabled to check whether or not the printing apparatus 100 is switched and currently set to the party mode by acquiring and confirming the printer name notified by the printing apparatus 100.

Next, printing modes of the printing apparatus 100 according to the present embodiment will be described with reference to FIGS. 4A and 4B. In a case where each of the mobile phones 200A, 200B, 200C, . . . transmits image data and a print instruction to the printing apparatus 100, and the printing apparatus 100 prints the received image data on recording sheets, it is envisaged that the printouts are delivered in the printing modes which are largely classified into two modes, shown in FIGS. 4A and 4B, respectively.

Figure 4A:
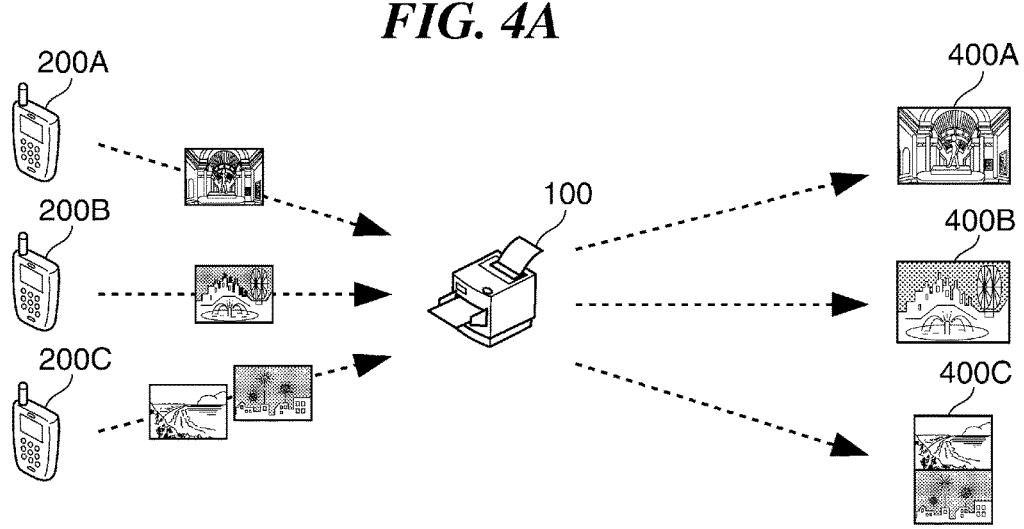
FIG. 4A is a diagram showing how images are printed out by the printing apparatus in a normal mode.

FIG. 4A shows the printing mode in which the mobile phones 200A, 200B, 200C, . . . give print start instructions to the printing apparatus 100, and as a result, the printing apparatus 100 delivers a printout 400A in response to the print instruction from the mobile phone 200A, a printout 400B in response to the print instruction from the mobile phone 200B, and a printout 400C in response to the print instruction from the mobile phone 200C. In the present embodiment, while a printing mode corresponding to a first mode of the present invention is referred to as the party mode (described hereinafter), a printing mode corresponding to a second mode of the present invention, shown in FIG. 4A, is referred to as the normal mode.

In the normal mode, the printing apparatus 100 lays out and prints an image or images received from one mobile phone on one recording sheet. Here, the printing apparatus 100 lays out and prints image data which has been received from a mobile phone before receiving a print start instruction from the corresponding mobile phone, on one recording sheet. That is, in the normal mode of the printing apparatus 100, shown in FIG. 4A, the mobile phone 200A and the mobile phone 200B each transmit a print start instruction after transmitting one image data item, and the mobile phone 200C transmits a print start instruction after transmitting two image data items.

Figure 4B:
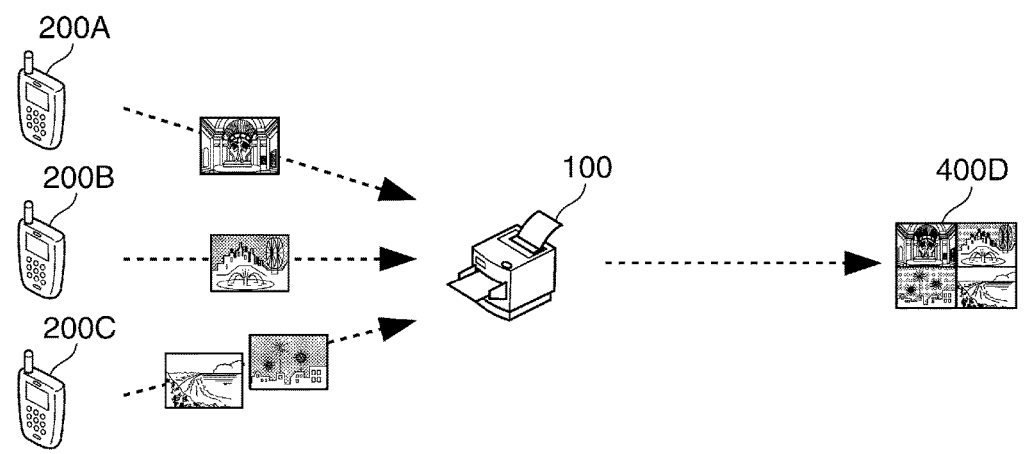
FIG. 4B is a diagram showing how images are printed out by the printing apparatus in a party mode.

FIG. 4B shows the printing mode in which the printing apparatus 100 gives print start instructions to the mobile phones 200A, 200B, 200C, . . . , and in response to the print start instructions, the printing apparatus 100 delivers a printout 400D. In the present embodiment, the printing mode of the printing apparatus 100, shown in FIG. 4B, is referred to as the party mode.

Although in the printout 400D, images of the image data items transmitted from the mobile phones 200A, 200B, 200C, . . . are laid out such that each image is equally allocated to an area corresponding to ¼ of the recording sheet, the printing apparatus 100 may be configured to be capable of setting the image layout such that each image is allocated to an allocation area stored in advance in the printing apparatus 100. Further, the printing apparatus 100 may be configured to be capable of dynamically calculating allocation areas and thereby setting the image layout such that images are unequally allocated to the allocation areas of the printout 400D. That is, the printing apparatus 100 is only required to have means for printing image data transmitted from at least two mobile phones 200 on one recording sheet.

Next, a description will be given of an operation sequence performed between the printing apparatus 100 and the mobile phones 200A, 200B, 200C, . . . when the printing apparatus 100 according to the present embodiment is set to the party mode, with reference to FIG. 5. The present sequence is described assuming that the printing apparatus 100 and the mobile phones 200A, 200B, 200C, . . . have already been connected to the same network. The mobile phones 200A, 200B, 200C, . . . may be connected to the same network as that of the printing apparatus 100 at respective appropriate timings.

Referring to FIG. 5, in a step S501, the user of the mobile phone 200A gives a print instruction using the print application installed in the mobile phone 200A or the basic function of the OS of the mobile phone 200A, and then the process proceeds to a step S502. In the step S502, the mobile phone 200A transmits a status acquisition request of the printing apparatus 100 using a protocol, such as User Datagram Protocol (UDP), and then the process proceeds to a step S503.

In the step S503, the printing apparatus 100 notifies the mobile phone 200A of the status of the printing apparatus 100 as a response to the status acquisition request received in the step S502. If the printing apparatus 100 is in a state in which a print start request can be received, the printing apparatus 100 notifies "idle" to the mobile phone 200A as the response, whereas if not, the printing apparatus 100 notifies "busy" to the mobile phone 200A as the response. The status of the printing apparatus 100 to be notified to the mobile phone 200A is not limited to "idle" or "busy", other statuses may be notified according to the state of the printing apparatus 100.

In a step S504, the mobile phone 200A establishes a Transmission Control Protocol (TCP) session with the printing apparatus 100, and transmits a print start request to the printing apparatus 100, and then the process proceeds to a step S505. Note that the print start request may be performed using other protocols, and the protocol is not limited to the TCP.

In the step S505, the mobile phone 200A transmits image data to the printing apparatus 100, and then the process proceeds to a step S506. The file formats of the image data include, for example, JPEG, GIF, PNG, BMP, and so forth, but the file format is not limited to these.

In the step S506, the printing apparatus 100 receives and stores the image data transmitted from the mobile phone 200A in the step S505, and then the process proceeds to a step S507. Note that the received image data may be stored after reducing the size of the data. In a case where an image area in which an image of the image data is to be arranged is determined in advance, it is possible to reduce the data size by resizing the image data to an image size suitable for printing in the image area.

Further, even in a case where the image area is not determined in advance, insofar as the size of the recording sheet is determined in advance, it is possible to reduce the data size by resizing the image data to an image size suitable for printing in an area within the recording sheet. Even in a case where the recording sheet size is not determined in advance, it is possible to reduce the data size by resizing the image data to an image size suitable for printing in an area within a maximum-size recording sheet printable by the printing apparatus 100.

In the step S507, the printing apparatus 100 transmits a print completion notification to the mobile phone 200A. In this step, the printing apparatus 100 disconnects the TCP session with the mobile phone 200A, and shifts to a state where another print start request can be received. In a case where the printing apparatus 100 is configured to be capable of receiving print start requests from a plurality of mobile phones at the same time, the printing apparatus 100 can receive a print start request from another mobile phone before transmitting the print completion notification. Further, the print completion notification is transmitted at a stage at which the printing apparatus 100 stores received image data.

In a step S508, the user of the mobile phone 200B gives a print instruction to the mobile phone 200B in the same manner as or a different manner from the step S501, and then the process proceeds to a step S509. In the step S509, the mobile phone 200B transmits a status acquisition request to the printing apparatus 100 in the same manner as or a different manner from the step S502, and then the process proceeds to a step S510.

In the step S510, the printing apparatus 100 notifies the mobile phone 200B of the status of the printing apparatus 100 as a response to the status acquisition request received in the step S509 in the same manner as or a different manner from the step S503, and then the process proceeds to a step S511. In the step S511, the mobile phone 200B transmits a print start request to the printing apparatus 100 in the same manner as or a different manner from the step S504, and then the process proceeds to a step S512.

In the step S512, the mobile phone 200B transmits image data to the printing apparatus 100 in the same manner as or a different manner from the step S505, and then the process proceeds to a step S513. In the step S513, the printing apparatus 100 receives the image data transmitted from the mobile phone 200B, and stores the received image data in the same manner as or a different manner from the step S506.

In a step S514, the user of the mobile phone 200C gives a print instruction to the mobile phone 200C in the same manner as or a different manner from the step S501, and then the process proceeds to a step S515. In the step S515, the mobile phone 200C transmits a status acquisition request to the printing apparatus 100 in the same manner as or a different manner from the step S502, and then the process proceeds to a step S516.

In the step S516, the printing apparatus 100 notifies the mobile phone 200C of the status of the printing apparatus 100 as a response to the status acquisition request received in the step S515, and then the process proceeds to a step S517. In the illustrated example shown in FIG. 5, in the step S516, the printing apparatus 100 has already received the print start request from the mobile phone 200B in the step S511, but has not transmitted a print completion notification to the mobile phone 200B yet, which is to be transmitted in the step S517, described hereinafter, and hence the printing apparatus 100 notifies "busy" to the mobile phone 200C as the status of the printing apparatus 100.

Since the mobile phone 200C is notified of "busy" by the printing apparatus 100, the mobile phone 200C does not shift to the step for transmitting a print start request to the printing apparatus 100. Note that if the printing apparatus 100 is configured to be capable of receiving print start requests from a plurality of mobile phones at the same time, the printing apparatus 100 may notify "idle" to the mobile phone in this case.

In the step S517, the printing apparatus 100 transmits a print completion notification to the mobile phone 200B in the same manner as or a different manner from the step S507, and then the process proceeds to a step S518. In the step S518, the mobile phone 200C transmits a status acquisition request to the printing apparatus 100 in the same manner as the step S515, and then the process proceeds to a step S519. The processing for transmitting a status acquisition request to the printing apparatus 100 may be periodically performed after the print instruction is provided by the user of the mobile phone 200C in the step S514, or may be performed after a print instruction is given again by the user of the mobile phone 200C.

In the step S519, the printing apparatus 100 notifies the mobile phone 200C of the status of the printing apparatus 100 as a response to the status acquisition request received in the step S518, and then the process proceeds to a step S520. In the illustrated example shown in FIG. 5, in the step S519, the printing apparatus 100 has already transmitted the print completion notification to the mobile phone 200B in the step S517, and hence the printing apparatus 100 notifies "idle" to the mobile phone 200C as the status of the printing apparatus 100.

In the step S520, the mobile phone 200C transmits a print start request to the printing apparatus 100 in the same manner as or a different manner from the step S504, and then the process proceeds to a step S521. In the step S521, the mobile phone 200C transmits image data to the printing apparatus 100 in the same manner as or a different manner from the step S505, and then the process proceeds to a step S522.

In the step S522, the printing apparatus 100 receives the image data transmitted from the mobile phone 200C in the step S521, and stores the received image data in the same manner as or a different manner from the step S506, and then the process proceeds to a step S523. In the step S523, the printing apparatus 100 transmits a print completion notification to the mobile phone 200C in the same manner as or a different manner from the step S507, and then the process proceeds to a step S524.

In the step S524, the printing apparatus 100 prints the image data stored in the steps S506, S513, and S522 on one recording sheet. Note that printing may be started when the number of image data items received and stored in the printing apparatus 100 has reached a specified number, or even when the number of image data items has not reached the specified number yet, printing may be started when a print start instruction is given to the printing apparatus 100 by a user's operation. That is, the printing apparatus 100 is only required to have means for printing, in a state in which two or more image data items are stored, the image data items on one recording sheet.

Next, a description will be given of a printing process performed by the printing apparatus 100 when print instructions are transmitted from the mobile phones 200A, 200B, 200C, . . . to the printing apparatus 100 according to the present embodiment, with reference to FIGS. 6 and 7A to 7G.

Figure 6:
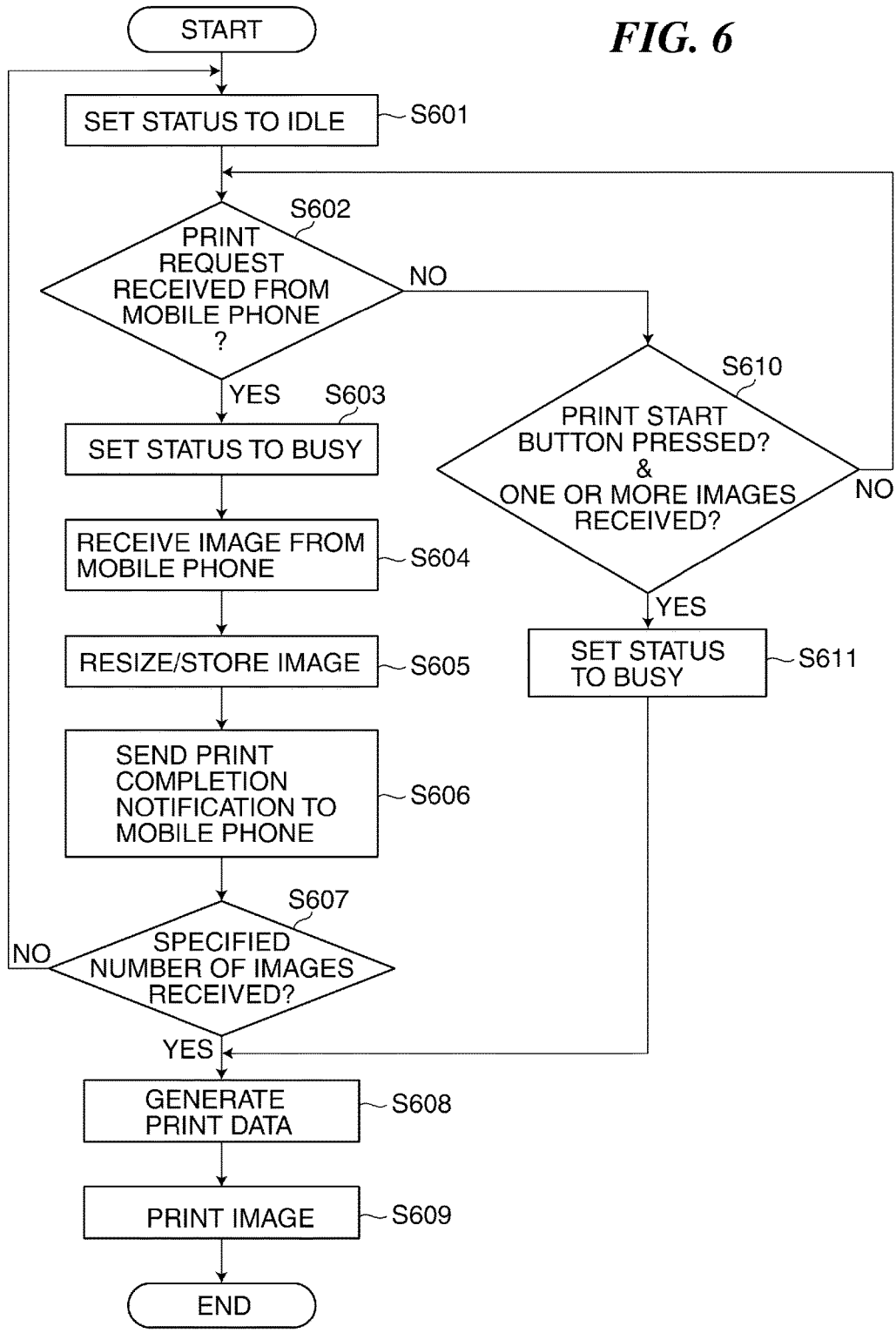
FIG. 6 is a flowchart of a printing process performed by the printing apparatus according to the first embodiment in the party mode.

FIG. 6 is a flowchart of the printing process performed by the printing apparatus 100 in the party mode. FIGS. 7A to 7G are diagrams each showing an example of the display on the display section 106 of the printing apparatus 100 in the party mode. The printing process in FIG. 6 is performed by a CPU and the like of the controller 101, by loading the program stored in the nonvolatile memory 102 of the printing apparatus 100 into the working memory 103. Further, it is assumed that an operation for operating the printing apparatus 100 as the simple AP or an operation for connecting the printing apparatus 100 to an external AP has been performed in advance for the printing apparatus 100, whereby the printing apparatus 100 is operating in a state set to be communicable via a wireless LAN network.

Figure 7A:
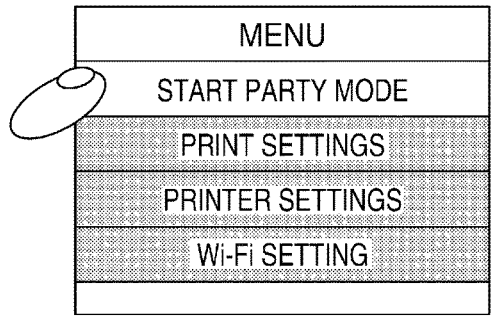
FIGS. 7A to 7G are diagrams each showing an example of the display on a display section of the printing apparatus in the party mode.
Figure 7B:
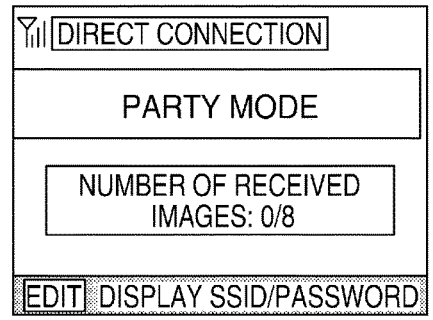
Figure 7C:

The printing process in FIG. 6 is started from a state in which an item of "start party mode" is selected by a user on a menu screen shown in FIG. 7A, and a party mode screen shown in FIG. 7B is displayed on the display section 106.

In a step S601, when the party mode is started, the controller 101 sets the status of the printing apparatus 100 to "idle" and proceeds to a step S602. In the step S602, the controller 101 waits until a print start request is received from the mobile phone 200 with which the controller 101 has established a TCP session via the connection section 109. Then, if the print start request is received from the mobile phone 200, the controller 101 proceeds to a step S603, whereas if not, the controller 101 proceeds to a step S610.

In the step S603, the controller 101 sets the status of the printing apparatus 100 to "busy", and proceeds to a step S604. In the step S604, the controller 101 receives image data from the mobile phone 200 via the connection section 109, and after completion of reception of the image data, the controller 101 proceeds to a step S605. During reception of the image data, the controller 101 displays a screen, shown in FIG. 7C, which indicates that image reception is in progress, on the display section 106.

In the step S605, the controller 101 stores the image data received in the step S604, and proceeds to a step S606. When storing the received image data, the controller 101 may perform resize processing, on an as-needed basis, and store the image data after reducing the data size. Further, for storage of the image data, the working memory 103 may be used or the recording medium 104 may be used. Although in the present embodiment, resize/storage processing is performed after completion of receipt of image data, receipt of image data and resize/storage processing may be performed in parallel, and further, only storage processing may be performed without performing resize processing.

Further, in a case where a plurality of image data items are received from the same mobile phone 200 of the plurality of mobile phones 200A and 200B in the step S604, the controller 101 may be configured to store one image data item of the plurality of received image data items. Further, in a case where a plurality of image data items are transmitted from the same mobile phone 200 of the plurality of the mobile phones 200A and 200B, as an image data of an image to be printed on one recording sheet in a step S609 described hereinafter, the controller 101 may be configured to not receive the second and subsequent image data items.

Further, in a case where a plurality of image data items are received from the same mobile phone 200 of the plurality of the mobile phones 200A and 200B, the controller 101 may be configured to print one image data item of the plurality of received image data items on one recording sheet. Further, in a case where a plurality of image data items are received from the same mobile phone 200 of the plurality of the mobile phones 200A and 200B, the controller 101 may be configured to delete an image data item which has been received from the corresponding mobile phone 200 and stored before, and store a newly received image data item.

In the step S606, the controller 101 transmits a print completion notification to the mobile phone 200 via the connection section 109, disconnects the TCP session, and then proceeds to a step S607. Note that what is notified to the mobile phone 200 in this step is not limited to the print completion notification, but may be an image transfer completion notification or the like.

Figure 7D:
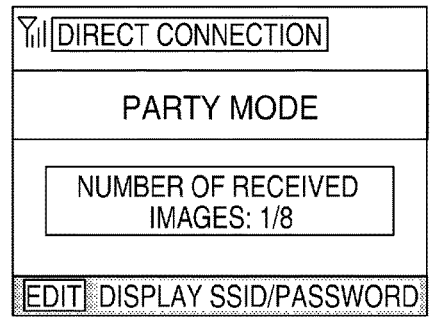
Figure 7E:
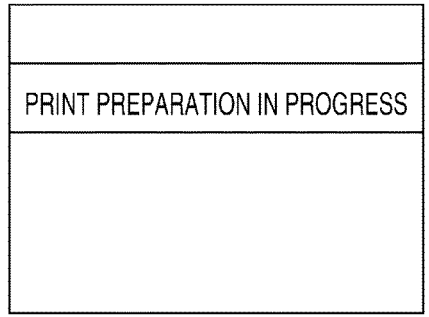

In the step S607, the controller 101 determines whether or not the number of image data items which have been received from the mobile phone 200 has reached a specified number. Then, if it is determined that the number of received image data items is less than the specified number, the controller 101 returns to the step S601, and waits for transmission of image data from the mobile phone 200 again. At this time, the controller 101 counts up and displays the number of received image data items in a display area on the display section 106, as shown in FIG. 7D. On the other hand, if it is determined that the number of received image data items has reached the specified number, the controller 101 proceeds to a step S608. Note that the specified number in this step may be changed by a user on a print setting menu, or may be set to a fixed number in the printing apparatus 100.

In the step S608, the controller 101 converts the image data to a data format printable by the printing section 108, and proceeds to the step S609. In the step S608, the controller 101 performs resize processing, image correction processing, image format conversion processing, and so forth, for printing the plurality of image data items, stored in the step S605, on one recording sheet, to thereby generate print data to be printed on one recording sheet. At this time, the controller 101 displays an image, shown in FIG. 7E, which indicates that the print preparation is in progress, on the display section 106.

Figure 7F:
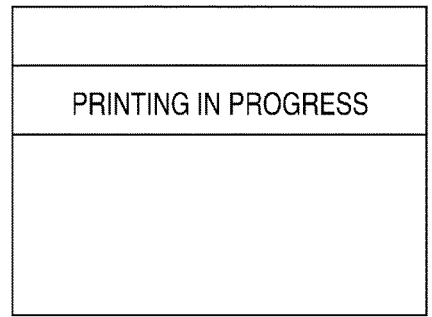

In the step S609, the controller 101 displays an image, shown in FIG. 7F, which indicates that printing is in progress, on the display section 106, and prints the plurality of image data items on one recording sheet, using the sheet feeder 107 and the printing section 108, followed by terminating the present process.

On the other hand, in the step S610, the controller 101 determines whether or not the print start button on the operation section 105 has been pressed, and also one or more image data items have been received from the mobile phone 200. Then, if it is determined that the print start button on the operation section 105 has not been pressed, or no image data has been received from the mobile phone 200, the controller 101 returns to the step S602, and waits for receipt of image data from the mobile phone 200 via the connection section 109. Further, if it is determined that the print start button on the operation section 105 has been pressed and also one or more image data items have been received from the mobile phone 200, the controller proceeds to a step S611, wherein the controller 101 sets the status of the printing apparatus 100 to "busy". Then, the controller 101 proceeds to the step S608, and performs processing for generating print data using the received image data.

As described above, in the present embodiment, it is possible to provide the printing apparatus 100 capable of printing image data items received from the plurality of mobile phones 200 on one recording sheet.

Next, a description will be given of a printing apparatus according to a second embodiment of the present invention, with reference to FIGS. 7A to 9. Component elements identical to those of the first embodiment will be described using the figures and reference numerals of the first embodiment, and the description is given mainly of different points from the first embodiment.

In the first embodiment, the description is given of the case where a plurality of image data items transmitted from the plurality of mobile phones 200 are printed on one recording sheet. On the other hand, in the present embodiment, the description is given of a case in which a plurality of image data items transmitted from the plurality of mobile phones 200 are printed on a plurality of recording sheets with the same layout.

Figure 7G:
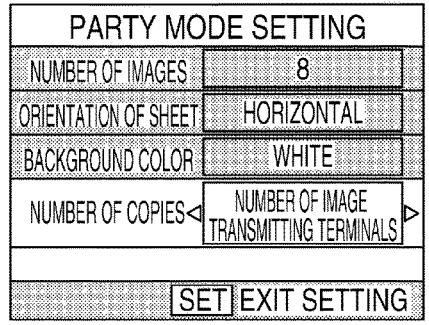

FIG. 7G shows an example of the display of a setting screen on which the settings associated with printing in the party mode can be changed. The screen shown in FIG. 7G may be displayed after the start of the party mode is instructed on the display shown in FIG. 7A and before displaying the screen shown in FIG. 7B, or may be displayed when an operation button concerning the settings and the menu is pressed in the state shown in FIG. 7B.

On the setting screen shown in FIG. 7G, the number of images which can be printed on one recording sheet, the orientation of a sheet, a background color, the number of copies, and so forth can be set. Here, in setting the number of copies, when not a fixed number, such as 1, 2, 3, . . . , but "number of image transmitting terminals" is selected, printing is performed on a number of recording sheets, which corresponds to the number of the mobile phones 200 that have transmitted image data to the printing apparatus 100.

Figure 8:
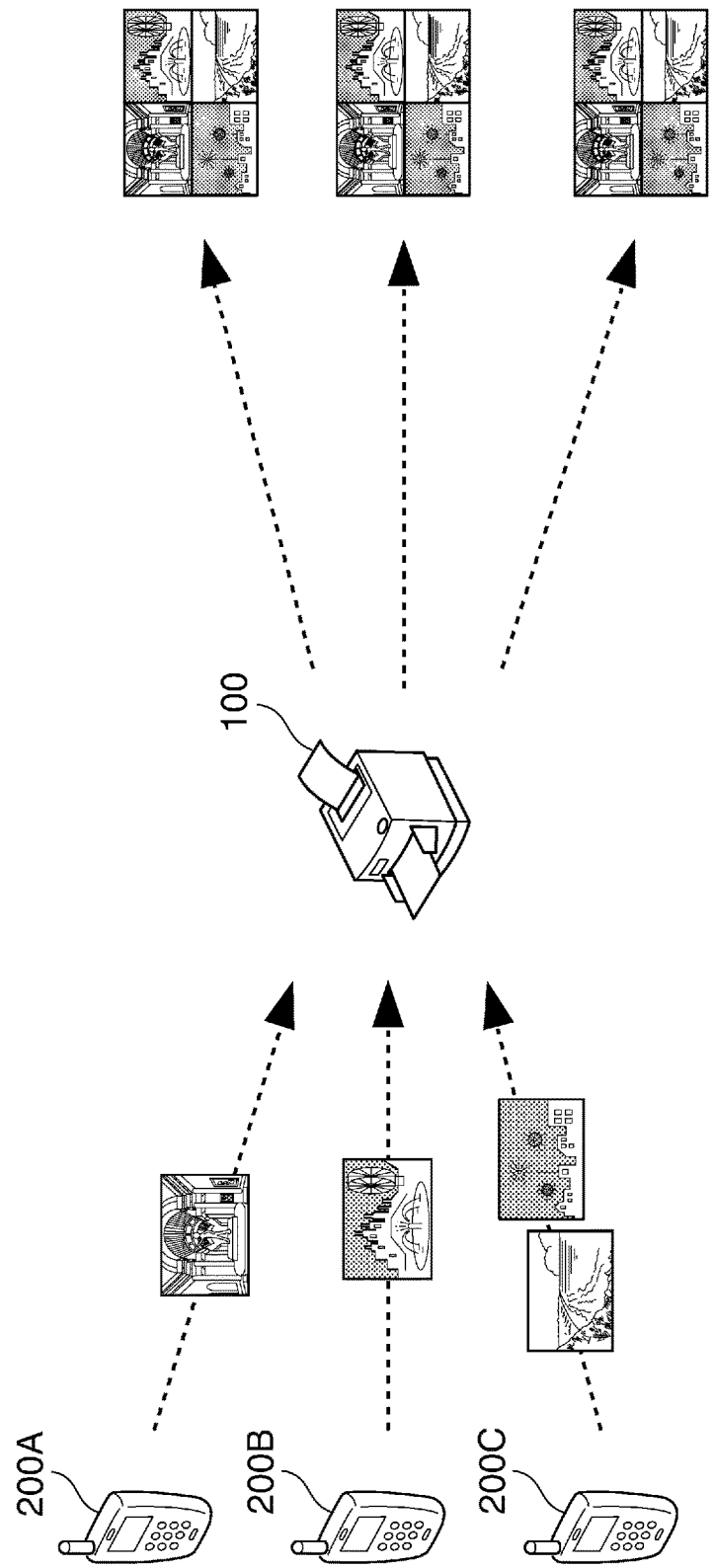
FIG. 8 is a diagram showing how images are printed out by a printing apparatus according to a second embodiment of the present invention in the party mode.

For example, a case, as shown in FIG. 8, will be described in which four image data items are transmitted from the three mobile phones 200A, 200B, and 200C. The printing apparatus 100 generates print data so as to make it possible to print the received four image data items on one recording sheet, and prints the generated print data. However, since the image data items have been transmitted from the three mobile phones 200, the same printing is performed additionally on two recording sheets.

Figure 9:
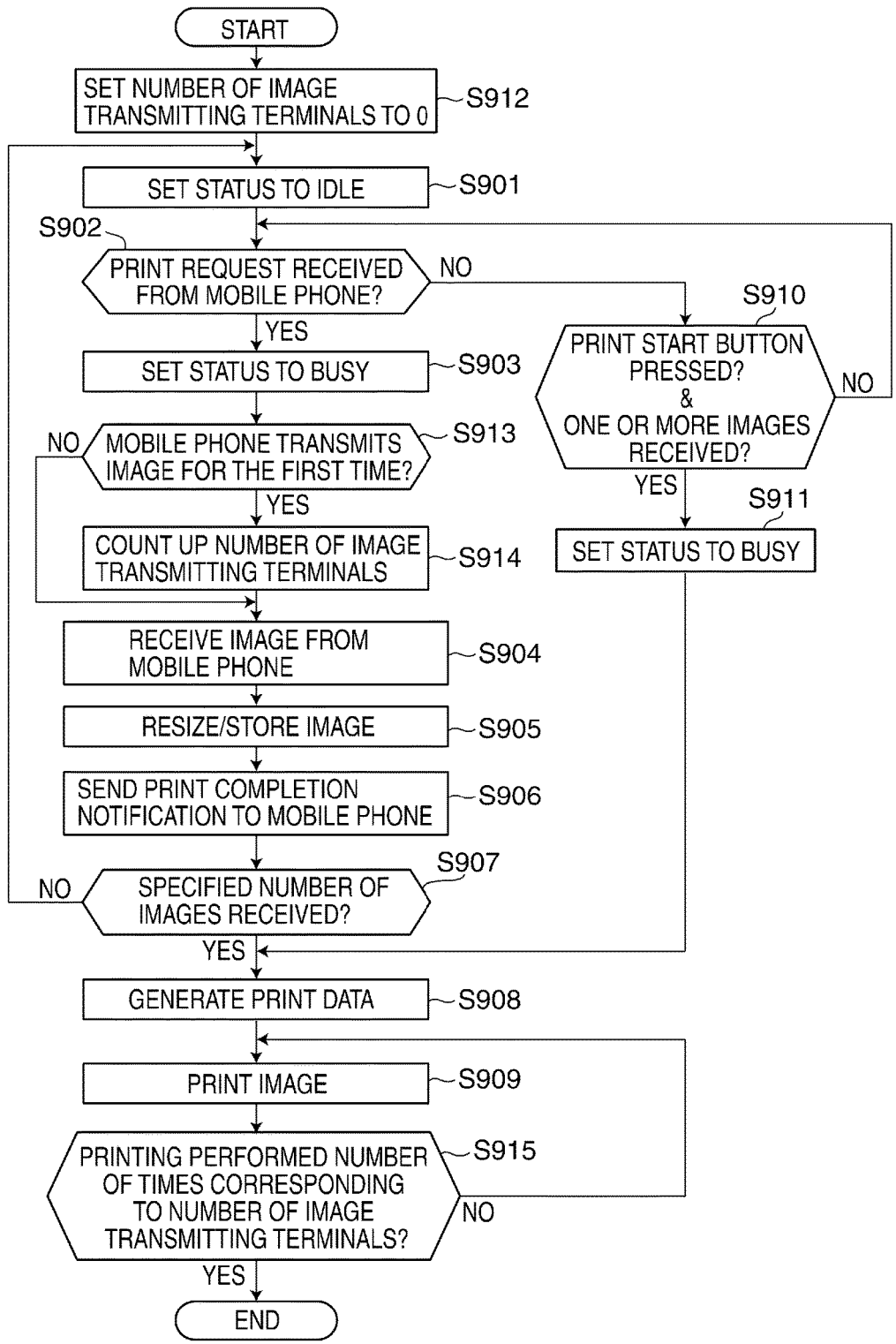
FIG. 9 is a flowchart of a printing process performed by the printing apparatus according to the second embodiment in the party mode.

FIG. 9 is a flowchart of a printing process performed by the printing apparatus 100 in the party mode. The printing process in FIG. 9 is performed by the CPU and the like of the controller 101 by loading a program stored in the nonvolatile memory 102 of the printing apparatus 100 into the working memory 103. Further, although similar to the printing process in FIG. 6, the printing process in FIG. 9 is started when the party mode is started, the number of copies is set to "number of image transmitting terminals" on the setting screen shown in FIG. 7G. Steps S901 to S911 in FIG. 9 are the same as the steps S601 to S611 in FIG. 6, and hence description thereof is omitted, and the description is given only of steps S912 to S915.

In the step S912, the controller 101 sets the value of "number of image transmitting terminals" as an internally stored value to 0, and proceeds to the step S901. In the step S913, the controller 101 determines whether or not the mobile phone 200 which has transmitted image data via the connection section 109 is a terminal from which image data has already been received.

Then, if it is determined that the mobile phone 200 is a terminal which has transmitted image data for the first time, the controller 101 proceeds to the step S914, counts up the value of "number of image transmitting terminals" which is an internally stored value, and proceeds to the step S904. On the other hand, if it is determined that the mobile phone 200 is a terminal from which image data has already been received, the controller 101 proceeds to the step S904. Note that when determining whether or not the mobile phone 200 is a terminal which has transmitted image data for the first time, the determination may be performed based on a MAC address or an IP address of the mobile phone 200, or may be performed by referring to other information.

In the step S915, the controller 101 determines whether or not print processing is performed the number of times corresponding to the value of "number of image transmitting terminals" which is the internally stored value. Then, if it is determined that the number of times of execution of print processing is less than "number of image transmitting terminals", the controller 101 returns to the step S909 to perform print processing. On the other hand, if it is determined that the number of times of execution of print processing has reached "number of image transmitting terminals", the controller 101 terminates the present process.

As described above, in the present embodiment, it is possible to provide the printing apparatus 100 that is capable of printing a number of recording sheets with the same layout, which corresponds to the number of the mobile phones 200 having transmitted the image data. Other configuration and advantageous effects are the same as those provided by the first embodiment.

Next, a description will be given of a printing apparatus according to a third embodiment of the present invention, with reference to FIGS. 10 to 12. Component elements identical to those of the first and second embodiments will be described using the figures and reference numerals of the first and second embodiments, and the description is given mainly of different points.

In the second embodiment, the description is given of the case where a plurality of image data items transmitted from the plurality of mobile phones 200 are printed on a plurality of recording sheets with the same layout. On the other hand, in the present embodiment, the description is given of a case in which a plurality of image data items transmitted from the plurality of mobile phones 200 are printed on a plurality of recording sheets with respective different layouts.

Shuffled layouts are an example of different print layouts using a plurality of the same image data items. A shuffled layout has features (1) to (3) described below.

(1) Each image is not trimmed, but is resized and laid out with its aspect ratio maintained.

(2) Images are laid out within one rectangle, with no space between the images, or with spaces made uniform between the images.

(3) Vertical and lateral distances between images arranged outermost and the edges of a sheet are made equal, respectively.

Figure 10:
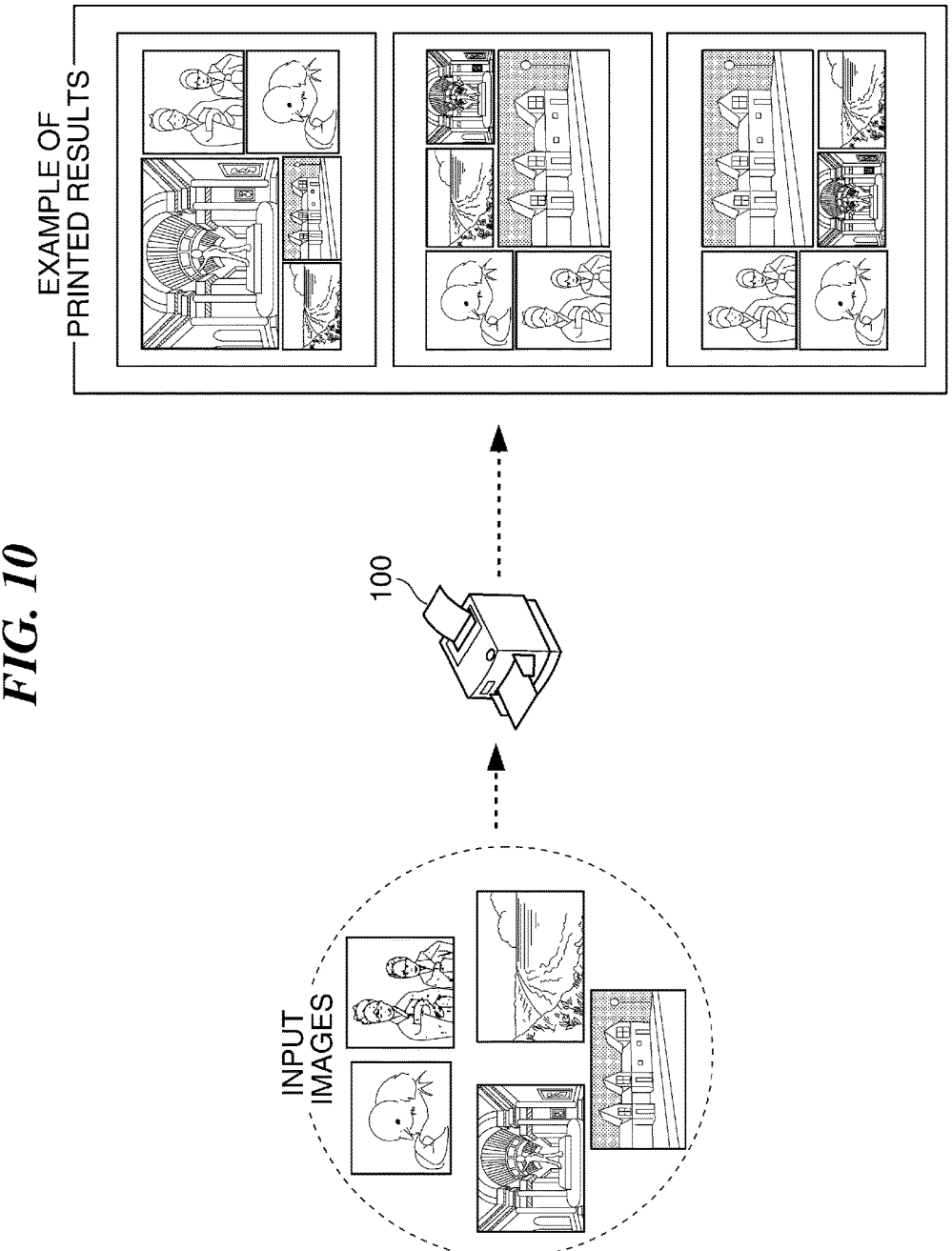
FIG. 10 is a diagram showing how a plurality of images are printed out with shuffled layouts by a printing apparatus according to a third embodiment of the present invention.
Figure 11:
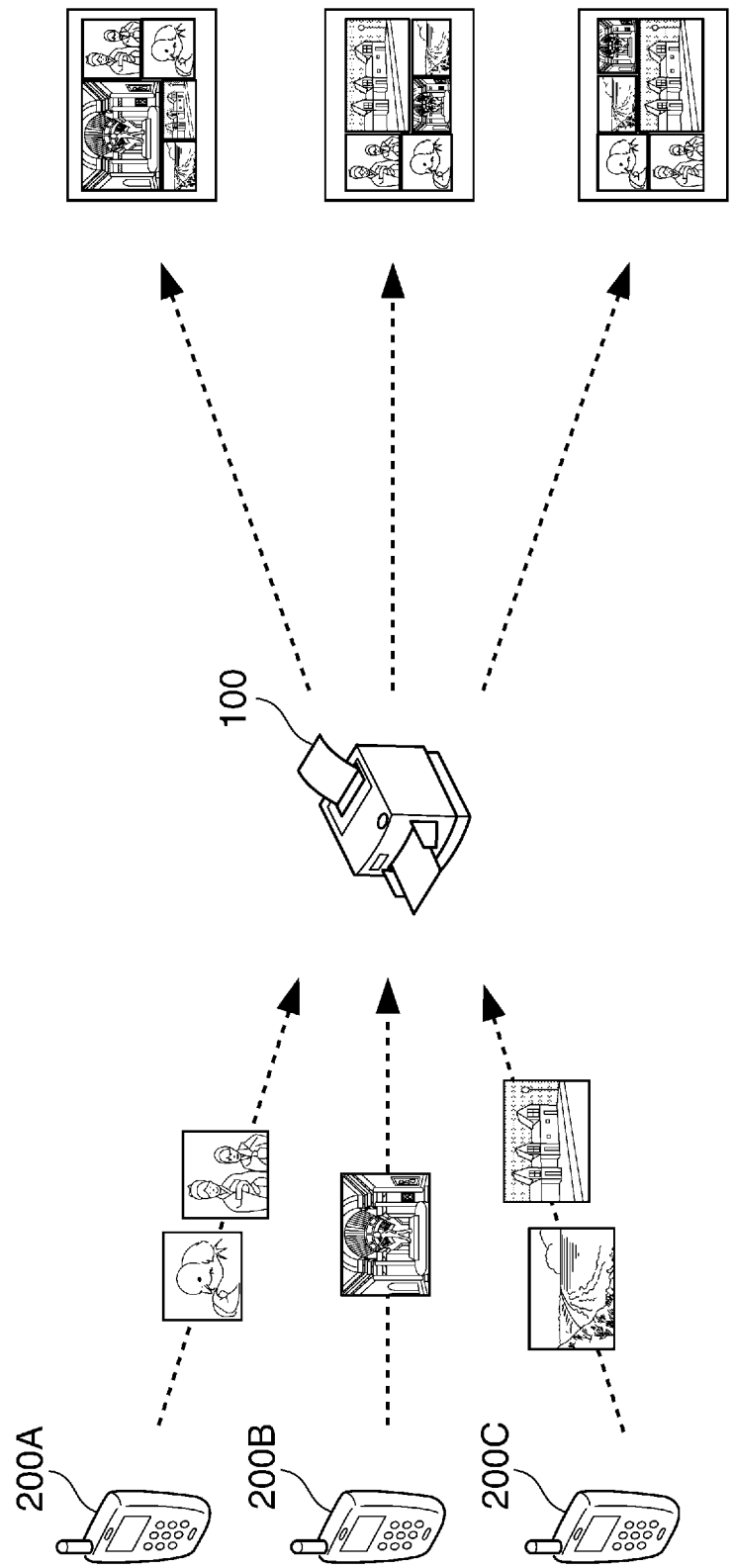
FIG. 11 is a diagram showing how images are printed out by the printing apparatus in the party mode to which the shuffled layout is applied.

The shuffled layouts make it possible to generate a plurality of patterns by calculation, as shown in FIG. 10, even when the same images are used. When the shuffled layout is applied to the party mode, it is possible to obtain recording sheets, as shown in FIG. 11, on which images of the image data items are printed with different layouts corresponding in number to the number of terminals having transmitted the image data.

Figure 12:
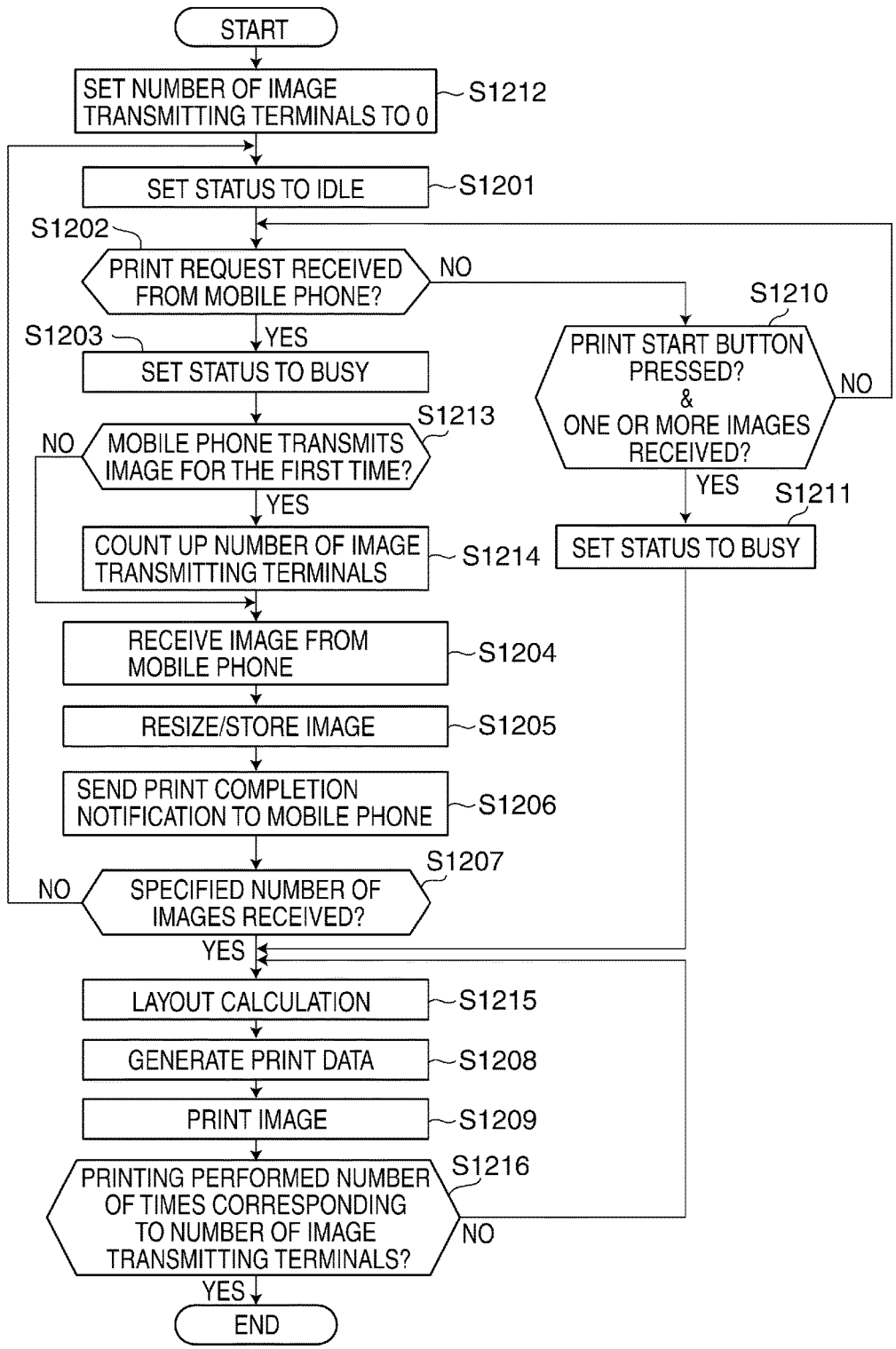
FIG. 12 is a flowchart of a printing process performed by the printing apparatus according to the third embodiment in the party mode.

FIG. 12 is a flowchart of a printing process performed by the printing apparatus 100. The printing process in FIG. 12 is performed by the CPU and the like of the controller 101 by loading a program stored in the nonvolatile memory 102 of the printing apparatus 100 into the working memory 103. Further, although the printing process in FIG. 12 is started, similar to the printing process in FIG. 9, when the party mode is started, it is assumed that the number of copies to be printed is equal to the value set to "number of image transmitting terminals" on the setting screen shown in FIG. 7G. Steps S1201 to S1214 in FIG. 12 are the same as the steps S901 to S914 in FIG. 9, and hence description thereof is omitted, and the description is given only of steps S1215 and S1216.

In the step S1215, the controller 101 performs shuffled layout calculation based on the aspect ratio of one or more image data items received from the mobile phones 200 and stored in the working memory 103 or the recording medium 104, and proceeds to the step S1208. This shuffled layout calculation is performed to determine the arrangement size and the position of each image data item. Note that the shuffled layout calculation uses random numbers so as to obtain a different result even when the layout calculation is repeatedly performed using the same algorithm.

In the step S1216, the controller 101 determines whether or not print processing has been performed for a number of copies, which corresponds to the value set to "number of image transmitting terminals" as an internally stored value. Then, if it is determined that the number of times of execution of print processing is less than "number of image transmitting terminals", the controller 101 returns to the step S1215, and performs processing from the shuffled layout calculation again. On the other hand, if it is determined that print processing is performed for the number of copies, which corresponds to the value set to "number of image transmitting terminals", the controller 101 terminates the present process.

As described above, in the present embodiment, it is possible to provide the printing apparatus 100 that is capable of printing recording sheets with different layouts corresponding in number to the number of the mobile phones 200 having transmitted the image data.

Although in the present embodiment, the shuffled layouts are described as the different print layouts using the plurality of the same images, by way of example, this is not limitative. For example, a layout determination method by another calculation method or a layout determination method in which images are applied to a template may be used. Other configuration and advantageous effects are the same as those provided by the first and second embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

This application claims the benefit of Japanese Patent Application No. 2016-242103 filed Dec. 14, 2016, which is hereby incorporated by reference herein in its entirety.

What is claimed is:

1. A printing apparatus comprising:
a communication interface configured to perform wireless communication with a plurality of external apparatuses including a first external apparatus and a second external apparatus different from the first external apparatus;
a printer configured to print images received from the plurality of external apparatuses by the communication interface, on a sheet; and
a controller configured to perform control such that when a number of images received from the plurality of external apparatuses by the communication interface reaches a specified number, the specified number of images received from the plurality of external apparatuses are printed on one sheet such that at least one image received from the first external apparatus and at least one image received from the second external apparatus are printed on the same sheet.

2. The printing apparatus according to claim 1, wherein the controller identifies the external apparatus which has transmitted an image received by the communication interface, from the plurality of external apparatuses.

3. The printing apparatus according to claim 1, wherein in a case where a plurality of images are received from the same external apparatus, the controller performs control such that one of the plurality of received images is printed on the one sheet.

4. The printing apparatus according to claim 3, further comprising a storage device configured to temporarily store images received from the plurality of external apparatuses by the communication interface, and
wherein in a case where a plurality of images are received from the same external apparatus, the controller performs control such that one of the plurality of received images is stored in the storage device.

5. The printing apparatus according to claim 4, wherein in a case where a plurality of images are received from the same external apparatus, the controller performs control such that an image which has already been received from the same external apparatus and stored in the storage device is deleted, and an image which is newly received from the same external apparatus is stored in the storage device.

6. The printing apparatus according to claim 2, wherein in a case where a plurality of images are transmitted from the same external apparatus as images to be printed on one sheet, the controller performs control such that the second and subsequent images are not received by the communication interface.

7. The printing apparatus according to claim 1, wherein the communication interface is configured to perform wireless communication with the plurality of external apparatuses via a wireless LAN, and
the controller is further configured to select between a first mode in which a plurality of images received from the plurality of external apparatuses are printed on one sheet, and a second mode in which an image received from one of the external apparatuses is printed on one sheet.

8. The printing apparatus according to claim 7, wherein in a case where the first mode is selected, the communication interface uses an SSID which is different from an SSID used in the second mode.

9. The printing apparatus according to claim 7, wherein in a case where the first mode is selected, the communication interface uses a printer name which is different from a printer name used in the second mode.

10. The printing apparatus according to claim 1, wherein the controller is further configured to receive a print start instruction from a user, and
in a case where the print start instruction is received, the controller performs control such that a plurality of images received from the plurality of external apparatuses by the communication interface are printed on one sheet even when the number of images received from the plurality of external apparatuses is less than the specified number.

11. The printing apparatus according to claim 1, further comprising a storage device configured to temporarily store images received from the plurality of external apparatuses by the communication interface, and
wherein the controller resizes each image received by the communication interface to a size adapted to the size of the sheet, and causes the resized image to be stored in the storage device.

12. The printing apparatus according to claim 1, wherein the controller performs control so as to lay out the specified number of images received from the plurality of external apparatuses within one rectangle, without trimming each image while maintaining an aspect ratio of each image, with no space between the images or with spaces made uniform between the images, and print the images on one sheet.

13. A method of controlling a printing apparatus including a communication interface configured to perform wireless communication with a plurality of external apparatuses including a first external apparatus and a second external apparatus different from the first external apparatus, and a printer configured to print images received from the plurality of external apparatuses by the communication interface, on a sheet, the method comprising:
determining whether a number of images received from the plurality of external apparatuses by the communication interface reaches a specified number; and
printing, in a case where it is determined that the number of images received from the plurality of external apparatuses reaches the specified number, the specified number of images received from the plurality of external apparatuses on one sheet such that at least one image received from the first external apparatus and at least one image received from the second external apparatus are printed on the same sheet.

14. A non-transitory computer-readable storage medium storing a computer-executable program for executing a method of controlling a printing apparatus including a communication interface configured to perform wireless communication with a plurality of external apparatuses including a first external apparatus and a second external apparatus different from the first external apparatus, and a printer configured to print images received from the plurality of external apparatuses by the communication interface, on a sheet,
wherein the method comprises:
determining whether a number of images received from the plurality of external apparatuses by the communication interface reaches a specified number; and
printing, in a case where it is determined that the number of images received from the plurality of external apparatuses reaches the specified number, the specified number of images received from the plurality of external apparatuses on one sheet such that at least one image received from the first external apparatus and at least one image received from the second external apparatus are printed on the same sheet.

15. A printing apparatus comprising:
a communication interface configured to perform wireless communication with a plurality of external apparatuses including a first external apparatus and a second external apparatus different from the first external apparatus;
a printer configured to print images received from the plurality of external apparatuses by the communication interface, on a sheet; and
a controller configured to perform control such that when a number of images received from the plurality of external apparatuses by the communication interface reaches a specified number, the specified number of images received from the plurality of external apparatuses are printed on one sheet,
wherein the controller is further configured to receive a print start instruction from a user, and
in a case where the print start instruction is received, the controller performs control such that a plurality of images received from the plurality of external apparatuses by the communication interface are printed on one sheet even when the number of images received from the plurality of external apparatuses is less than the specified number.

16. The printing apparatus according to claim 15, wherein the controller sets the specified number according to a user operation.

17. A printing apparatus comprising:
a communication interface configured to perform wireless communication with a plurality of external apparatuses including a first external apparatus and a second external apparatus different from the first external apparatus;
a printer configured to print images received from the plurality of external apparatuses by the communication interface, on a sheet; and
a controller configured to perform control such that when a number of images received from the plurality of external apparatuses by the communication interface reaches a specified number, the specified number of images received from the plurality of external apparatuses are printed on one sheet, wherein the communication interface is configured to perform wireless communication with the plurality of external apparatuses via a wireless LAN, and the controller switches between a first mode in which a plurality of images received from the plurality of external apparatuses are printed on one sheet and a second mode in which an image received from one of the external apparatuses is printed on one sheet according to a user operation.

18. The printing apparatus according to claim 17, wherein the controller sets the specified number according to the user operation.

* * * * *